US008808125B2

United States Patent
Tsuchida et al.

(10) Patent No.: US 8,808,125 B2
(45) Date of Patent: Aug. 19, 2014

(54) HYBRID VEHICLE DRIVING APPARATUS

(75) Inventors: Michitaka Tsuchida, Miyoshi (JP); Tomoaki Nishizuru, Anjo (JP); Tatsuo Obata, Toyota (JP); Natsuki Sada, Anjo (JP); Hirotaka Yata, Kariya (JP); Tomoo Atarashi, Kariya (JP)

(73) Assignees: Toyota Jidosha Kabushiki Kaisha, Toyota-shi (JP); Aisin Aw Co., Ltd., Anjo-shi (JP)

( * ) Notice: Subject to any disclaimer, the term of this patent is extended or adjusted under 35 U.S.C. 154(b) by 133 days.

(21) Appl. No.: 13/553,091

(22) Filed: Jul. 19, 2012

(65) Prior Publication Data

US 2013/0184111 A1 Jul. 18, 2013

(30) Foreign Application Priority Data

Jul. 19, 2011 (JP) ................................. 2011-158435

(51) Int. Cl.
| | |
|---|---|
| *F16H 3/72* | (2006.01) |
| *F16H 37/06* | (2006.01) |
| *B60K 6/445* | (2007.10) |
| *F16H 37/08* | (2006.01) |
| *B60K 6/40* | (2007.10) |
| *B60K 6/405* | (2007.10) |

(52) U.S. Cl.
CPC ............ *F16H 37/0826* (2013.01); *B60K 6/445* (2013.01); *B60K 6/40* (2013.01); *B60K 6/405* (2013.01); *Y02T 10/6239* (2013.01)
USPC ............................. 475/5; 475/4; 180/65.235

(58) Field of Classification Search
USPC .................................... 475/1–10; 180/65.235
See application file for complete search history.

(56) References Cited

U.S. PATENT DOCUMENTS

| | | | | |
|---|---|---|---|---|
| 6,692,394 | B2 * | 2/2004 | Takenaka | 475/5 |
| 7,081,060 | B2 * | 7/2006 | Hata et al. | 475/5 |
| 2009/0023529 | A1 * | 1/2009 | Sanji et al. | 475/5 |

FOREIGN PATENT DOCUMENTS

| | | | | |
|---|---|---|---|---|
| JP | 8-91065 | | 4/1996 | |
| JP | 2001-187535 | | 7/2001 | |
| JP | 2009166740 A | * | 7/2009 | ............. F16H 57/02 |
| JP | 2009-262859 | | 11/2009 | |
| JP | 2010-70099 | | 4/2010 | |

OTHER PUBLICATIONS

Office Action issued Mar. 5, 2013 in Japanese Application No. 2011-158435.

* cited by examiner

*Primary Examiner* — Tisha Lewis
(74) *Attorney, Agent, or Firm* — Oblon, Spivak, McClelland, Maier & Neustadt, L.L.P.

(57) ABSTRACT

A hybrid vehicle driving apparatus includes: a first rotor shaft of a first electric motor, the first electric motor being disposed on a first axis; a power distribution mechanism that includes a planetary gear device and is disposed on the first axis; an output gear shaft that serves as an output member of the power distribution mechanism and is disposed on the first axis; a counter shaft disposed on a second axis; a second rotor shaft of a second electric motor disposed on a third axis; a power transmission shaft disposed on the third axis; a differential gear disposed on a fourth axis; and a casing that includes a plurality of case members. The output gear shaft, the power transmission shaft, the counter shaft, the differential gear, the first rotor shaft, and the second rotor shaft are rotatably supported by a common case member that is one of the plurality of case members.

2 Claims, 3 Drawing Sheets

HYBRID VEHICLE DRIVING APPARATUS

INCORPORATION BY REFERENCE

The disclosure of Japanese Patent Application No. 2011-158435 filed on Jul. 19, 2011 including the specification, drawings and abstract is incorporated herein by reference in its entirety.

BACKGROUND OF THE INVENTION

1. Field of the Invention

The invention relates to a hybrid vehicle driving apparatus.

2. Description of Related Art

There is known a hybrid vehicle driving apparatus which includes a rotor shaft of a first electric motor that is disposed on a first axis, a power distribution mechanism that includes a planetary gear device is disposed on the first axis, and an output gear shaft that serves as an output member of the power distribution mechanism on the first axis. The hybrid vehicle driving apparatus also includes a counter shaft that is disposed on a second axis, a rotor shaft of a second electric motor that is disposed on a third axis, a power transmission shaft that is disposed on the third axis, and a differential gear that is disposed on a fourth axis. In addition to the above, the hybrid vehicle driving apparatus includes a casing that is made up of a plurality of case members. The casing supports the rotor shaft of the first electric motor, the power distribution mechanism, the output gear shaft, the counter shaft, the rotor shaft of the second electric motor, the power transmission shaft and the differential gear.

Japanese Patent Application Publication No. 2001-187535 (JP 2001-187535 A) discloses a hybrid vehicle driving apparatus as described above. In JP 2001-187535 A, a hybrid vehicle driving apparatus includes a rotor shaft (first rotor shaft) of first electric rotation means (first electric motor), a planetary gear (power distribution mechanism), a vehicle-travel rotating shaft (output gear shaft), a counter shaft, an output shaft (second rotor shaft) of a second electric rotation means (second electric motor), a counter drive gear (power transmission shaft), a differential device (differential gear) and an integrated case (casing). The rotor shaft, the planetary gear and the vehicle-travel rotating shaft are disposed on a first axis. The vehicle-travel rotating shaft is linked to the planetary gear. An end portion of the vehicle-travel rotating shaft is provided with a counter drive gear. The counter shaft is disposed on a second axis. The counter shaft is provided with a large gear and a small gear. The output shaft and the counter drive gear are disposed on a third axis. The differential device is disposed on a fourth axis. The integrated case is made up of a housing, a case and a rear cover. The rotor shaft, the planetary gear, the vehicle-travel rotating shaft, the counter shaft, the output shaft, the counter drive gear and the differential device are rotatably supported by the integrated case.

In the hybrid vehicle driving apparatus of JP 2001-187535 A, the vehicle-travel rotating shaft, the counter shaft, the output shaft, the counter drive gear and the differential device are rotatably supported by the case. The rotor shaft is rotatably supported by a center support. that the center support is fixed to the case by bolts or the like. If the rotor shaft is supported by the center support, the accuracy of supporting the first electric means declines due to the mounting error of the center support. In addition, since the number of component parts increases, the weight of the vehicle or cost may increase.

SUMMARY OF THE INVENTION

The invention provides a hybrid vehicle driving apparatus in which the supporting accuracy of rotating shafts supported by a casing that is made up of a plurality of case members is improved.

A hybrid vehicle driving apparatus as a first aspect of the invention includes: a first rotor shaft of a first electric motor, the first rotor shaft being disposed on a first axis; a power distribution mechanism that includes a planetary gear device and is disposed on the first axis; an output gear shaft that serves as an output member of the power distribution mechanism and is disposed on the first axis; a counter shaft disposed on a second axis; a second rotor shaft of a second electric motor, the second rotor shaft being disposed on a third axis; a power transmission shaft disposed on the third axis; a differential gear disposed on a fourth axis; and a casing that includes a plurality of case members. The output gear shaft, the power transmission shaft, the counter shaft, the differential gear, the first rotor shaft, and the second rotor shaft are supported rotatably by a common case member that is one of the plurality of case members.

In the first aspect of the invention, the output gear shaft, the power transmission shaft, the counter shaft, the differential gear, the first rotor shaft, and the second rotor shaft of the second electric motor are supported by the case member (common case member) that is common to those shafts and the differential gear. This improves the accuracy of supporting those rotating shafts and the differential gear. Furthermore, since the shafts and the differential gear are all supported by the common case member, increases in the number of component parts and increases in the weight can be restrained.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described in detail with reference to the drawings. In the embodiments, the drawings are simplified or modified as appropriate. Thus, the dimensional proportions of various portions, the configurations thereof, etc. are not accurately illustrated in the drawings.

Figure 1:
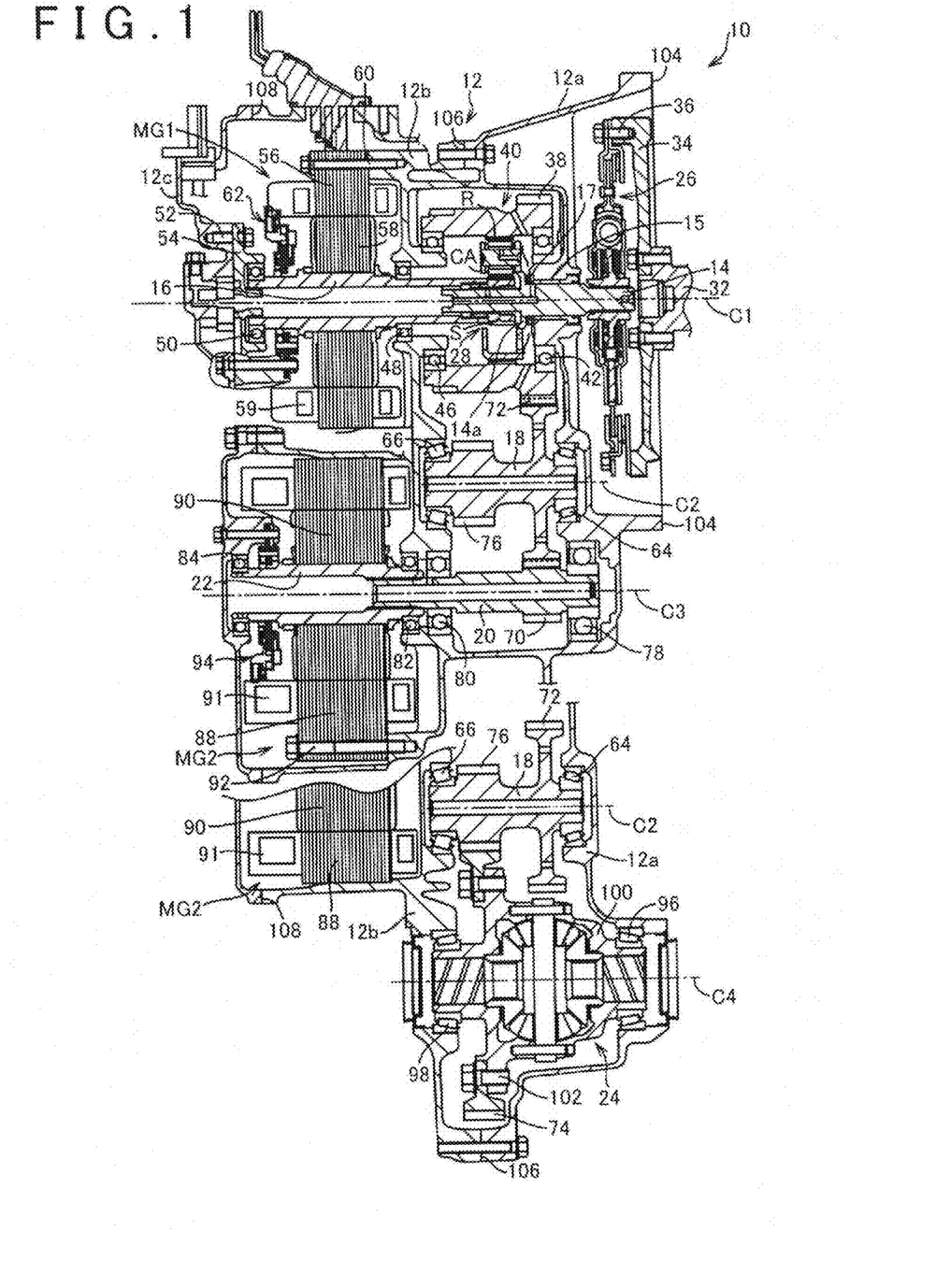
FIG. 1 is a sectional view describing a structure of a hybrid vehicle driving apparatus in accordance with a first embodiment of the invention.

FIG. 1 is a sectional view illustrating a structure of a hybrid vehicle driving apparatus 10 in accordance with a first embodiment of the invention. The hybrid vehicle driving apparatus 10 (hereinafter, the driving apparatus 10) has four rotation axes (C1 to C4) in a casing 12. On a first axis C1, there are an input shaft 14, a power distribution mechanism 28 and a first rotor shaft 16 of a first electric motor MG1 that are rotatably supported. A counter shaft 18 is rotatably supported on a second axis C2. A power transmission shaft 20 and a second rotor shaft 22 of a second electric motor MG2 are rotatably supported on a third axis C3. On a fourth axis C4, a differential gear 24 is rotatably supported. The first axis C1, the second axis C2, the third axis C3 and the fourth axis C4 are parallel to each other.

The casing 12 is constructed of three case members, which are a housing 12a, a case 12b and a cover 12c. End surfaces (joining surfaces) of the case members in the axis direction are fastened together by bolts. Thus, the case members are assembled as a single casing 12. The case 12b is provided with a partition wall 13 that is substantially perpendicular to the rotation axes. The housing 12a, the case 12b and the cover 12c may be regarded as case members in the invention.

The input shaft 14 is rotatably supported by the housing 12a via a bush 15 and a thrust bearing 17. Thus, the input shaft 14 is rotatable relative to the housing 12a.

A damper device 26 and the power distribution mechanism 28 are disposed at an outer periphery of the input shaft 14. The power distribution mechanism 28 includes a planetary gear device. The damper device 26 absorbs torque fluctuations transmitted from an engine (not shown). The damper device 26 is interposed between the engine and the input shaft 14 so as to transmit power therebetween. An outer peripheral portion of the damper device 26 is fastened to a disc-shaped flywheel 34 by bolts 36. The flywheel 34 is linked to a crankshaft 32 of the engine. An inner peripheral portion of the damper device 26 is fitted by spline to an end of the input shaft 14 in the axis direction.

The power distribution mechanism 28 is constructed mainly of a sun gear S, a ring gear R, pinions and a carrier CA. The sun gear S and the ring gear R are rotatable about the first axis C1. The pinions mesh with the sun gear S and the ring gear R. The carrier CA supports the pinions so that the pinions are revolvable about the first axis C1 and are rotatable about their own axes. The sun gear S is linked to the first rotor shaft 16 by spline-fitting so as to be unrotatable relative to the first rotor shaft 16. The carrier CA is connected to a brim portion 14a that extends radially outward from the input shaft 14. The ring gear R is provided with an inner peripheral portion of a composite gear shaft 40. The composite gear shaft 40 is provided with a counter drive gear 38 that will be described later.

The composite gear shaft 40 is rotatably supported by the casing 12 via a first bearing 42 and a second bearing 46. Concretely, the first bearing 42 is disposed on an axial end portion of an inner periphery of the composite gear shaft 40 which end portion is toward a damper device 26. Thus, the composite gear shaft 40 is supported by the housing 12a via the first bearing 42 so as to be rotatable relative to the housing 12a. The second bearing 46 is disposed on an axial end portion of the inner periphery of the composite gear shaft 40 which end portion is at the first electric motor MG1 side. Thus, the composite gear shaft 40 is supported by the partition wall 13 of the case 12b via the second bearing 46 so as to be rotatable relative to the partition wall 13. The composite gear shaft 40 may be regarded as an output gear shaft in the invention. The second bearing 46 may be regarded as an output gear bearing in the invention.

The first rotor shaft 16 is supported by the casing 12 via a third bearing 48 and a fourth bearing 50. Concretely, the third bearing 48 is disposed on an outer peripheral portion of the first rotor shaft 16. The outer peripheral portion is adjacent to an intermediate axial portion of the first rotor shaft 16. The first rotor shaft 16 is supported by the partition wall 13 of the case 12b via the third bearing 48 so as to be rotatable relative to the partition wall 13. The fourth bearing 50 is disposed on an end portion of the outer periphery of the first rotor shaft 16 which end portion is at the cover 12c side. In this manner, the first rotor shaft 16 is supported by a cover member 54 via the fourth bearing 50 so as to be rotatable relative to the cover member 54. The cover member 54 is fixed to the cover 12c. An outer wheel of the third bearing 48 is press-fitted into the partition wall 13 of the case 12b (outer wheel press-fitting). Besides, the first rotor shaft 16 may be regarded as a first rotor shaft of a first electric motor in the invention. The third bearing 48 may be regarded as a first rotor bearing in the invention.

The first electric motor MG1 is disposed at the outer periphery of the first rotor shaft 16. The first electric motor MG1 mainly has a stator 56, a rotor 58 and coil ends 59. The stator 56 is unrotatably fixed to the casing 12 (case 12b) by bolts 60. An inner peripheral portion of the rotor 58 is fixed to the first rotor shaft 16 so as to be unrotatable relative to the first rotor shaft 16. Therefore, rotation of the first electric motor MG1 is transmitted to the first rotor shaft 16. A resolver 62 for detecting the rotation speed of the first rotor shaft 16, that is, the rotation speed of the first electric motor MG1, is fixed to the cover 12c.

The counter shaft 18 is disposed on the second axis C2. The counter shaft 18 is supported by the casing 12 via a fifth bearing 64 and a sixth bearing 66 so as to be rotatable relative to the casing 12. Concretely, the fifth bearing 64 is disposed on an axial end portion of an outer periphery of the counter shaft 18 which end portion is at the housing 12a side. The counter shaft 18 is supported by the housing 12a via the fifth bearing 64 so as to be rotatable relative to the housing 12a. The sixth bearing 66 is disposed at an axial end portion of the outer periphery of the counter shaft 18 which end portion is at the case 12b side. In this manner, the counter shaft 18 is supported by the partition wall 13 of the case 12b via the sixth bearing 66 so as to be rotatable relative to the partition wall 13. The outer wheel of the sixth bearing 66 is press-fitted into the partition wall 13 of the case 12b (outer wheel press-fitting). The sixth bearing 66 may be regarded as a counter bearing in the invention.

A counter driven gear 72 is formed on a housing 12a-side portion of the counter shaft 18. The counter driven gear 72 meshes with the counter drive gear 38 and a reduction gear 70 that is described later. Besides, a differential drive gear 76 is formed on a case 12b-side portion of the counter shaft 18. The differential drive gear 76 meshes with a differential ring gear 74 (described below). The counter drive gear 38, the reduction gear 70, the counter driven gear 72, the differential ring gear 74 and the differential drive gear 76 are all bevel gears.

The power transmission shaft 20 disposed on the third axis C3 is supported by the casing 12 via a seventh gearing 78 and an eighth bearing 80 so as to be rotatable relative to the casing 12. Concretely, the seventh bearing 78 is disposed on an end portion of an outer periphery of the power transmission shaft 20 which end portion is at the housing 12a side. In this manner, the power transmission shaft 20 is supported by the housing 12a via the seventh bearing 78 so as to be rotatable relative to the housing 12a. The eighth bearing 80 is disposed on an axial end portion of the outer periphery of the power transmission shaft 20 which end portion is at the case 12b side. In this manner, the power transmission shaft 20 is supported by the partition wall 13 of the case 12b via the eighth bearing 80 so as to be rotatable relative to the partition wall 13. The eight bearing 80 may be regarded as a power transmission bearing in the invention.

The reduction gear 70 that meshes with the counter driven gear 72 is formed on the power transmission shaft 20. An axial end portion the power transmission shaft 20 which is at the eight bearing 80 side is fitted by spline to the second rotor shaft 22 so as to be unrotatable relative to the second rotor shaft 22. The second rotor shaft 22 is supported by the casing 12 via a ninth bearing 82 and a tenth bearing 84 so as to be rotatable relative to the casing 12. Concretely, the ninth bearing 82 is disposed on an axial end portion of an outer periphery of the second rotor shaft 22 which end portion is at the power transmission shaft 20 side. In this manner, the second rotor shaft 22 is supported by the partition wall 13 of the case 12b via the ninth bearing 82 so as to be rotatable relative to the partition wall 13. The tenth bearing 84 is disposed on an axial end portion of the outer periphery of the second rotor shaft 22 which end portion is at the cover 12c side. In this manner, the second rotor shaft 22 is supported by the cover 12c via the tenth bearing 84 so as to be rotatable relative to the cover 12c. The outer wheel of the ninth bearing 82 is press-fitted into the partition wall 13 of the case 12b (outer wheel press-fitting). The second rotor shaft 22 may be regarded as a rotor shaft of a second electric motor in the invention. Besides, the ninth bearing 82 may be regarded as a second rotor bearing in the invention.

The second electric motor MG2 is disposed on an outer periphery of the second rotor shaft 22. The second electric motor MG2 mainly has a stator 88, a rotor 90 and coil ends 91. The stator 88 is unrotatably fixed to the casing 12 (case 12b) by bolts 92. An inner peripheral portion of the rotor 88 is fixed to the second rotor shaft 22 so as to be unrotatable relative to the second rotor shaft 22. Therefore, rotation of the second electric motor MG2 is transmitted to the second rotor shaft 22. The second rotor shaft 22 is fitted by spline to the power transmission shaft 20. Therefore, rotation of the second rotor shaft 22 is transmitted to the reduction gear 70. A resolver 94 for detecting the rotation speed of the second rotor shaft 22, that is, the rotation speed of the second electric motor MG2, is fixed to the cover 12c.

The differential gear 24 is disposed on the fourth axis, and serves as a differential mechanism. The differential gear 24 is supported by the casing 12 via an eleventh bearing 96 and a twelfth bearing 98 so as to be rotatable relative to the casing 12. Concretely, an end of an outer periphery of the differential case 100 in the axis direction is rotatably supported by the housing 12a via the eleventh bearing 96. Thus, the differential case 100 is rotatable relative to the housing 12a. The other end of the outer periphery of the differential case 100 in the axis direction is rotatably supported by the case 12b via the twelfth bearing 98. Thus the differential case 100 is rotatable relative to the case 12b. A differential ring gear 74 is fixed to an outer periphery of the differential case 100 by bolts 102. The differential ring gear 74 meshes with the differential drive gear 76. Concrete construction and operation of the differential gear 24 are known, and therefore the description thereof is omitted herein. The twelfth bearing 98 may be regarded as a differential gear bearing in the invention.

Figure 2:
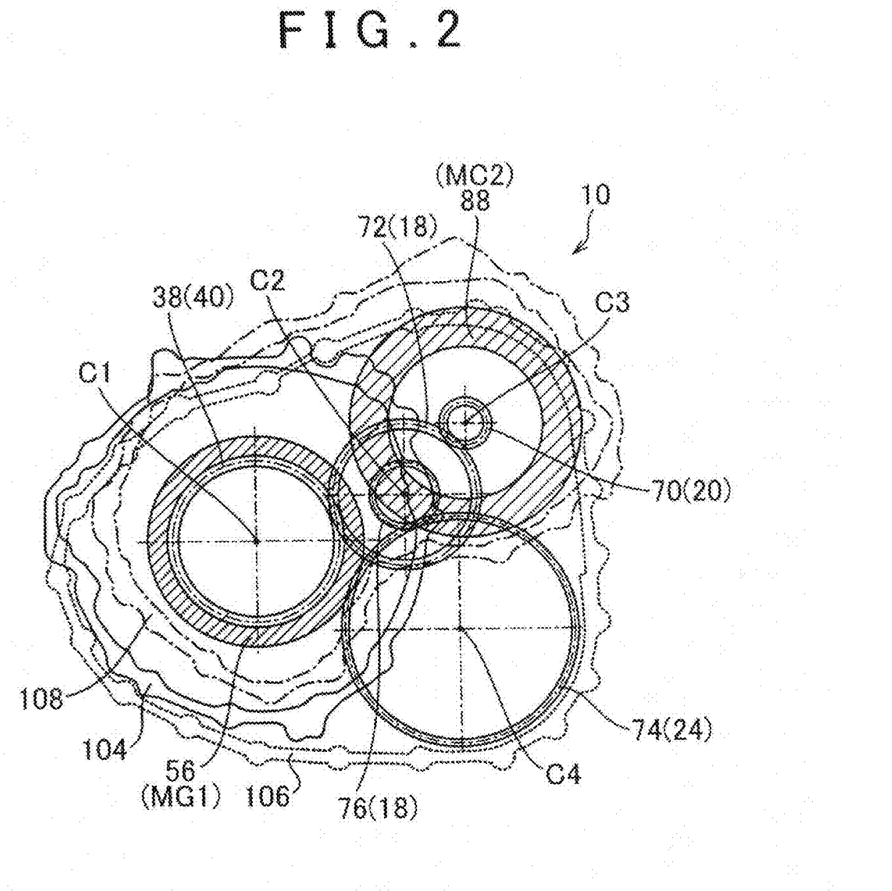
FIG. 2 is a diagram simply illustrating the positions at which a power transmission shaft, a differential gear, a composite gear, a first electric motor and a second electric motor are disposed; and the positions of the axes of the shafts described above.

In FIG. 1, a drawing that includes the differential gear 24 that meshes with the differential drive gear 76 and a drawing that includes the reduction gear 70 that meshes with the counter driven gear 72 are separately shown. This is because the first axis C1, the second axis C2, the third axis C3 and the fourth axis C4 are not disposed on the same level. Concretely, the axes C1 to C4 are disposed as shown in FIG. 2. FIG. 2 is a diagram showing, in a simplified manner, positions of the counter shaft 18, the power transmission shaft 20, the differential gear, the composite gear shaft 40, the first electric motor MG1 and the second electric motor MG2, and the positions of the axes C1 to C4. FIG. 2 corresponds to a view of the driving apparatus shown in FIG. 1 which is taken in a direction parallel to the axes C1 to C4. In FIG. 2, the upper side corresponds to an upper side in the vertical direction. In FIG. 2, surfaces enclosed by solid lines show joining surfaces 104 between the housing 12a shown in FIG. 1 and an engine case (not shown). Surfaces enclosed by broken lines show joining surfaces 104 between the case 12b and the housing 12a shown in FIG. 1. Besides, the surfaces enclosed by chain lines show joining surfaces 108 of the case 12b and the cover 12c.

As shown in FIG. 2, the third axis C3 is positioned uppermost in the vertical direction among the axes C1 to C4. The third axis C3 is the rotation axis of the second electric motor MG2 and the power transmission shaft 20. The fourth axis C4 is positioned lowermost in the vertical direction. The fourth axis C4 is the rotation axis of the differential gear 24. The second axis C2 is positioned in a region that is surrounded by the first axis C1, the third axis C3 and the fourth axis C4. The second axis C2 is the rotation axis of the counter shaft 18. Then, the counter drive gear 38 and the reduction gear 70 are in mesh with the counter driven gear 72. The differential drive gear 76 is in mesh with the differential ring gear 74.

Referring back to FIG. 1, the driving apparatus 10 of the first embodiment has a construction in which the composite gear shaft 40, the first rotor shaft 16, the counter shaft 18, the power transmission shaft 20, the second rotor shaft 22 and the differential gear 24 are rotatably supported by the case 12b. Concretely, an axial end portion of the inner periphery of composite gear shaft 40 which axial end portion is at the first electric motor MG1 side is supported by the partition wall 13 of the case 12b via the second bearing 46. Thus, the composite gear shaft 40 is rotatable relative to the partition wall 13. An outer periphery of an axial middle portion of the first rotor shaft 16 is supported by the partition wall 13 of the case 12b via the third bearing 48. Thus the first rotor shaft 16 is rotatable relative to the partition wall 13. An axial end portion of the outer periphery of the counter shaft 18 which axial end portion is at the case 12b side is supported by the partition wall 13 of the case 12b via the sixth bearing 66. Thus the counter shaft 18 is rotatable relative to the partition wall 13. An axial end portion of the outer periphery of the power transmission shaft 20 which end portion is at the case 12b side is rotatably supported by the partition wall 13 of the case 12b via the eighth bearing 80. Thus, the power transmission shaft 20 is rotatable relative to the partition wall 13. An axial end portion of the outer periphery of the second rotor shaft 22 which axial end portion is at the power transmission shaft 20 side is supported by the partition wall 13 of the case 12b via the ninth bearing 82. Thus, the second rotor shaft 22 is rotatable relative to the partition wall 13. An axial end of the outer periphery of the differential case 100, which constitutes the differential gear 24, is supported by the case 12b via the twelfth bearing 98 so that the differential case 100 is rotatable relative to the case 12b. Thus, since the rotating shafts 40, 16, 18, 20 and 22 and the differential gear 24 are all supported by a common member, that is, the case 12b, the accuracy of supporting the rotating shafts improves.

The composite gear shaft 40, the input shaft 14, the counter shaft 18, the power transmission shaft 20 and the differential gear 24 are rotatably supported by the housing 12a. Concretely, an axial end portion of the inner periphery of the composite gear shaft 40 which axial end portion is at the damper device 26 side is rotatably supported by the housing 12a via the first bearing 42. Thus, the composite gear shaft 40 is rotatable relative to the housing 12a. The input shaft 14 is supported by the housing 12a via the bush 15 and the thrust bearing 17 so as to be rotatable relative to the housing 12a. An axial end portion of the outer periphery of the counter shaft 18 which axial end portion is at the housing 12a side is supported by the housing 12a via the fifth bearing 64. Thus, the counter shaft 18 is rotatable relative to the housing 12a. An axial end portion of the outer periphery of the power transmission shaft 20 which axial end portion is at the housing 12a side is supported by the housing 12a via the seventh bearing 78. Thus, the power transmission shaft 20 is rotatable relative to the housing 12a. An axial end of the outer periphery of the differential case 100, which constitutes the differential gear 24, is supported by the housing 12a via the eleventh bearing 96. Thus, the differential case 100 is rotatable relative to the housing 12a. Since the rotating shafts 40, 16, 18, 20 and 22 and the differential gear 24 are all supported by a common member, that is, the housing 12a, the accuracy of supporting the rotation shafts improves.

As described above the eighth bearing 80 supports the power transmission shaft 20 and the sixth bearing 66 supports the counter shaft 18. As shown in FIG. 1, the eighth bearing 80 and the sixth bearing 66 are disposed at such positions as to overlap each other in the radial directions. That is, the axial positions of the eighth bearing 80 and the sixth bearing 66 at least partly overlap each other. By disposing the eighth bearing 80 and the sixth bearing 66 as described above, the eighth bearing 80 and the sixth bearing 66 are disposed near the partition wall 13 that is formed in the case 12b. Due to this, the moment load that is input into the case 12b via the eighth bearing 80 and the sixth bearing 66 during power transmission is reduced. Hence, the amount or number of ribs for enhancing the rigidity of the case 12b may be reduced. That is, the mass of the case 12b may be reduced. Furthermore, since the moment load can be reduced, the rigidity of the case 12b becomes relatively high. Therefore, the gear noise that occurs at the time of power transmission is reduced. The moment load may be regarded as a moment force that occurs in such a direction as to deform the case 12b (the partition wall 13) during power transmission. The closer the position at which the bearing is disposed is to the partition wall 13, the shorter the distance (the arm of the moment) between the site at which the load is input and the partition wall 13 becomes. Therefore, in the first embodiment, the moment load that is input to the case 12b (the partition wall 13) is reduced. Incidentally, in the first embodiment, the meshing gears, such as the counter drive gear 38 and the like, are all bevel gears. Therefore, thrust load is also input to the case 12b, so that the influence of the moment load becomes conspicuous. That is, it becomes more likely that the case members will deform. In the first embodiment, the bearings are disposed at such positions as to overlap each other in the radial directions. Thus, the moment load is input to the vicinity of the partition wall 13 so that the moment load that acts to deform the case members is effectively reduced.

As shown in FIG. 1, the second bearing 46 that supports the composite gear shaft 40 and the sixth bearing 66 that supports the counter shaft 18 are disposed at such positions as to overlap each other in the radial directions. In this manner of disposal, the second bearing 46 and the sixth bearing 66 are disposed in the vicinity of the partition wall 13 that is formed in the case 12b. Due to this, the moment load that is input to the case 12b via the second bearing 46 and the sixth bearing 66 during power transmission is reduced. Hence, the amount or number of ribs for enhancing the rigidity of the case 12b may be reduced. That is, the mass of the case 12b may be reduced. Furthermore, since the moment load is reduced, the rigidity of the case 12b becomes relatively high. Therefore, the gear noise that occurs at the time of power transmission is reduced. Furthermore, as shown in FIG. 1, since the second bearing 46 is disposed in the vicinity of the partition wall 13 of the case 12b, the length of the composite gear shaft 40 in the axial direction becomes longer. Hence, the inertial of the composite gear shaft 40 increases, so that clattering noise is reduced. In the related art, in order to reduce the clattering noise, the engine is operated in a region deviated from an optimum fuel economy curve. In the invention, the need for such a counter measure declines, so that the fuel economy can be also improved.

As shown in FIG. 1, the eighth bearing 80 that supports the power transmission shaft 20 and the twelfth bearing 98 that supports the differential gear 24 (the differential case 100) are disposed at such positions as to overlap each other in the radial directions. In this manner of disposal, the eighth bearing 80 and the twelfth bearing 98 are disposed in the vicinity of the partition wall 13 that is formed in the case 12b. Due to this, the moment load that is input to the case 12b via the eighth bearing 80 and the twelfth bearing 98 during the power transmission are reduced. Hence, the amount or number of ribs for enhancing the rigidity of the case 12b may be reduced. That is, the mass of the case 12b may be reduced. Furthermore, since the moment load is reduced, the rigidity of the case 12b becomes relatively high. Therefore, the gear noise that occurs at the time of power transmission is reduced. The portion formed in the partition wall 13 of the case 12b so as to support the eighth bearing 80 and the twelfth bearing 98 becomes shorter in the axial direction. Therefore, the flow of lubricating oil thrown up by the differential ring gar 74 is restrained from being impeded by the portion of the partition wall 13 which supports the bearings.

As shown in FIG. 1, the eighth bearing 80 that supports the power transmission shaft 20 and the second bearing 46 that supports the composite gear shaft 40 are disposed at such positions as to overlap each other in the radial directions. In this manner of disposal, the eighth bearing 80 and the second bearing 46 are disposed in the vicinity of the partition wall 13 that is formed in the case 12b. Due to this, the moment load that is input to the case 12b via the eighth bearing 80 and the second bearing 46 during power transmission is reduced. Hence, the amount or number of ribs for enhancing the rigidity of the case 12b may be reduced. That is, the mass of the case 12b may be reduced. Furthermore, since the moment load is reduced, the rigidity of the case 12b becomes relatively high. Therefore, the gear noise that occurs at the time of power transmission is reduced. The axial length that supports the power transmission shaft 20 and the axial length that supports the composite gear shaft 40 become substantially equal. Therefore, it becomes easier to make equal the slopes of the power transmission shaft 20 and the composite gear shaft 40, so that the gear noise can be further reduced.

As shown in FIG. 1, the second bearing 46 that supports the composite gear shaft 40 and the twelfth bearing 98 that supports the differential gear (the differential case 100) are disposed at such positions as to overlap each other in the radial directions. In this manner of disposal, the second bearing 46 and the twelfth bearing 98 are disposed in the vicinity of the partition wall 13 that is formed in the case 12b. Due to this, the moment load that is input to the case 12b via the second bearing 46 and the twelfth bearing 98 during power transmission is reduced. Hence, the amount or number of ribs for enhancing the rigidity of the case 12b may be reduced. That is, the mass of the case 12b may be reduced. Furthermore, since the moment load is reduced, the rigidity of the case 12b becomes relatively high. Therefore, the gear noise that occurs at the time of power transmission is reduced. Each of the differential gear 24 and the first electric motor MG1 is across the partition wall 13 of the case 12b from each other in the axial direction. Therefore, the differential gear 24 and the first electric motor MG1 do not overlap each other in the radial directions. Hence, the radial position of the first electric motor MG1 becomes easily adjustable. Therefore, a diameter of the first electric motor MG1 suitable for the purpose of improving fuel economy may be set. Furthermore, the length of the first electric motor MG1 in the radial directions may be set so as to restrain the length of the first electric motor MG1 in the axis direction.

Furthermore, as shown in FIG. 1, the sixth bearing 66 that supports the counter shaft 18 and the twelfth bearing 98 that supports the differential gear 24 (the differential case 100) are disposed at such positions as to overlap each other in the radial directions. In this manner of disposal, the sixth bearing 66 and the twelfth bearing 98 are disposed in the vicinity of the partition wall 13 that is formed in the case 12b. Due to this, the moment load that is input to the case 12b via the sixth bearing 66 and the twelfth bearing 98 during power transmission may be reduced. Hence, the amount or number of ribs for enhancing the rigidity of the case 12b may be reduced. That is, the mass of the case 12b may be reduced. Furthermore, since the moment load is reduced, the rigidity of the case 12b becomes relatively high. Therefore, the gear noise that occurs at the time of power transmission is reduced. The portion formed in the partition wall 13 of the case 12b so as to support the sixth bearing 66 and the twelfth bearing 98 become shorter in the axial direction. Due to this, it make the flow of lubricating oil, which is thrown up by the differential ring gar 74, less unlikely to be inhibited by the portion of the partition wall 13 which supports the bearings.

Furthermore, as shown in FIG. 1, the second bearing 46 that supports the composite gear shaft 40, the sixth bearing 66 that supports the counter shaft 18 and the eighth bearing 80 that supports the power transmission shaft 20 are disposed at such positions as to radially overlap each other. That is, each of the second bearing 46, the sixth bearing 66 and the eighth bearing 80 radially overlaps each of the other of the second bearing 46, the sixth bearing 66 and the eighth bearing 80. The expression "each of the second bearing 46, the sixth bearing 66 and the eighth bearing 80 radially overlaps each of the other of the second bearing 46, the sixth bearing 66 and the eighth bearing 80" means in the embodiment "the second bearing 46 radially overlaps the sixth bearing 66, the sixth bearing 66 radially overlaps the eighth bearing 80 and the eighth bearing 80 radially overlaps the second bearing 46" In this manner of disposal, the second bearing 46, the sixth bearing 66 and the eighth bearing 80 are disposed in the vicinity of the partition wall 13 that is formed in the case 12b. Due to this, the moment load, which is input to the case 12b via the second bearing 46, the sixth bearing 66 and the eighth bearing 80 during power transmission, is reduced. Hence, the amount or number of ribs for enhancing the rigidity of the case 12b may be reduced. That is, the mass of the case 12b may be reduced. Furthermore, since the moment load is reduced, the rigidity of the case 12b becomes relatively high. Therefore, the gear noise that occurs at the time of power transmission is reduced. The first electric motor MG1 and the second electric motor MG2 lie astride the partition wall 13 of the case 12b. Due to this, the position of the first electric motor MG1 and the position of the second electric motor MG2 in the axial direction are made to substantially coincide with each other. Hence, the axial positions of the coil ends 59 of the first electric motor MG1 and the axial positions of the coil ends 91 of the second electric motor MG2 may be made to substantially coincide with each other. The coil ends 59 are disposed on the both axial ends of the stator 56 of the first electric motor MG1 and the coil ends 91 are disposed on the both axial ends of the stator 88 of the second electric motor MG2. Hence, a cooling oil passageway for cooling the coil ends 59 and 91 may be constructed in a simple fashion.

Furthermore, as shown in FIG. 1, the sixth bearing 66 that supports the counter shaft 18, the eighth bearing 80 that supports the power transmission shaft 20 and the twelfth bearing 98 that supports the differential gear 24 (the differential case 100) are disposed at such positions as to overlap each other in the radial directions. In this manner of disposal, the sixth bearing 66, the eighth bearing 80 and the twelfth bearing 98 are disposed in the vicinity of the partition wall 18 that is formed in the case 12b. Due to this, the moment load that is input to the case 12b via the sixth bearing 66, the eighth bearing 80 and the twelfth bearing 98 during power transmission is reduced. Hence, the amount or the number of ribs for enhancing the rigidity of the case 12b may be reduced. That is, the mass of the case 12b may be reduced. Furthermore, since the moment load is reduced, the rigidity of the case 12b becomes relatively high. Therefore, the gear noise that occurs at the time of power transmission is reduced. The torque that is input to the counter shaft 18, the power transmission shaft 20 and the differential gear 24 is larger than the torque that is input to the other shafts. Therefore, the moment load that is input to the sixth bearing 66, the eighth bearing 80 and the twelfth bearing 98 is also larger than the moment load that is input to the other bearings. Hence, the effect of the disposal in which the sixth bearing 66, the eighth bearing 80 and the twelfth bearing 98 radially overlap each other is more conspicuous than that of a disposal in which the other bearings radially overlap each other.

Furthermore, as shown in FIG. 1, the second bearing 46 that supports the composite gear shaft 40, the sixth bearing 66 that supports the counter shaft 18, the eighth bearing 80 that supports the power transmission shaft 20 and the twelfth bearing 98 that supports the differential gear 24 (the differential case 100) are disposed as such positions as to radially overlap each other. In this manner of disposal, the second bearing 46, the sixth bearing 66, the eighth bearing 80 and the twelfth bearing 98 are disposed in the vicinity of the partition wall 13 that is formed in the case 12b. Due to this, the moment load that is input to the case 12b via the bearings 46, 66, 80 and 98 during power transmission is reduced. Hence, the amount or number of ribs for enhancing the rigidity of the case 12b may be reduced. That is, the mass of the case 12b may be reduced. Furthermore, since the moment load is reduced, the rigidity of the case 12b becomes relatively high. Therefore, the gear noise that occurs at the time of power transmission is reduced. Furthermore, as shown in FIG. 1, the partition wall 13 of the case 12b may be formed so as to be substantially flat. Due to this, the rigidity of the case 12b, for example, for the load input from the inverter that is mounted on an upper surface of the case 12b, improves. Due to this, the amount or number of ribs for enhancing the rigidity of the case 12b and/or the housing 12a may be reduced. That is, mass of the casing 12 may be reduced.

According to the first embodiment, since the composite gear shaft 40, the power transmission shaft 20, the counter shaft 18, the differential gear 24, the first rotor shaft 16 of the first electric motor MG1 and the second rotor shaft 22 of the second electric motor MG2 are supported by a common member, that is, the case member 12b, the accuracy of supporting the rotating shafts improves. Furthermore, since the shafts and the like are supported by the case member 12b, increases in the number of component parts or increases in weight are restrained.

Furthermore, according to the first embodiment, at least two of the third bearing 46 that supports the composite gear shaft 40, the eighth bearing 80 that supports the power transmission shaft 20, the sixth bearing 66 that supports the counter shaft 18 and the twelfth bearing 98 that supports the differential gear 24 radially overlap each other. In this manner, the bearings are disposed in the vicinity of the partition wall 13 that is formed by the case member 12b. Due to this, the moment load that is input to the case member 12b via the bearings during power transmission is reduced. Hence, the amount or number of ribs for enhancing the rigidity of the case 12b may be reduced. That is, the mass of the case 12b may be reduced. Furthermore, since the moment load is reduced, the rigidity of the case 12b becomes relatively high, so that the gear noise be reduced.

Next, a second embodiment of the invention will be described. In the following description, portions that are substantially the same as those of the first embodiment are denoted by the same reference characters, and will not be redundantly described.

Figure 3:
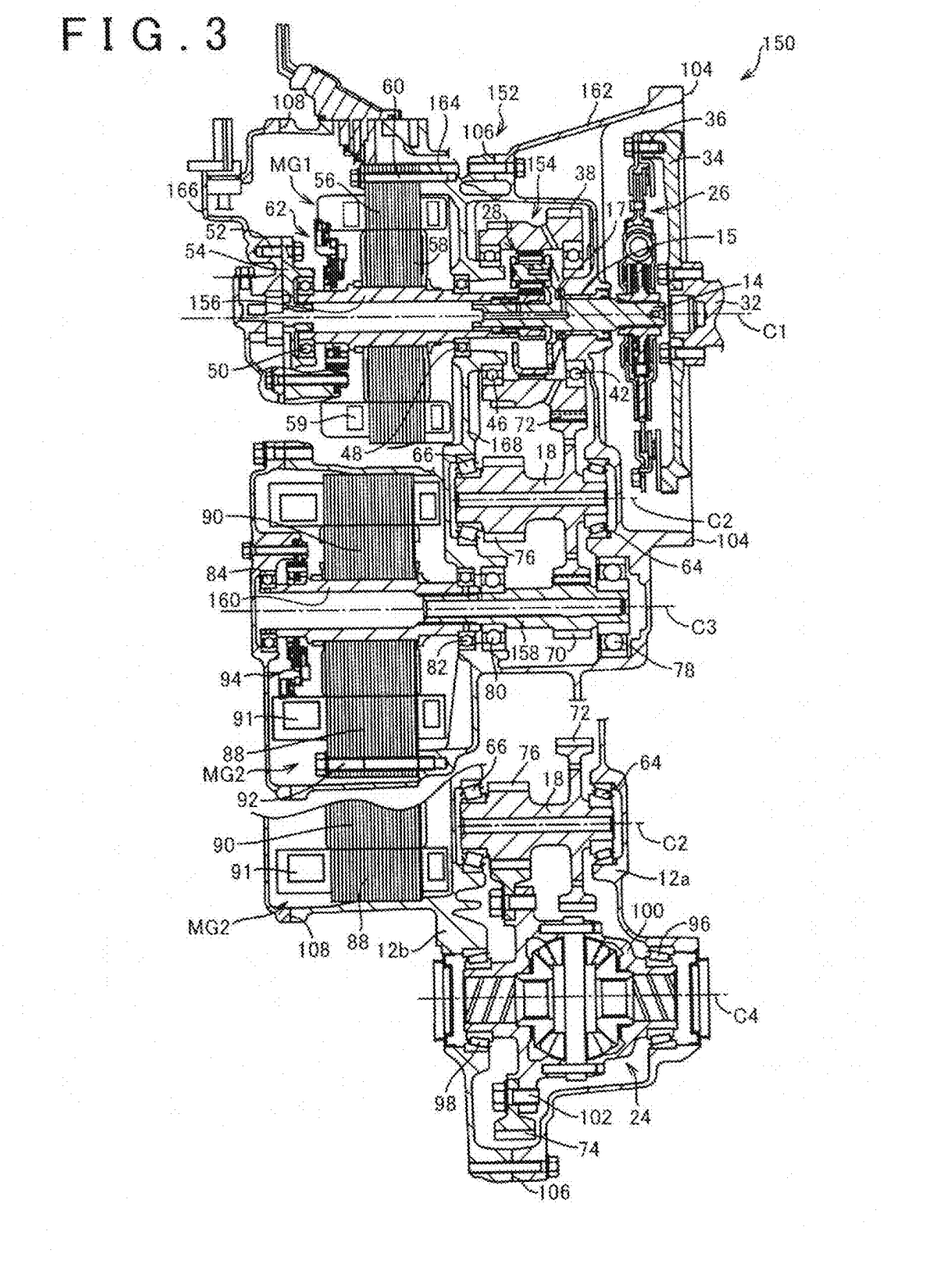
FIG. 3 is a sectional view illustrating a structure of a hybrid vehicle driving apparatus in accordance with a second embodiment of the invention.

FIG. 3 is a sectional view for describing a structure of a hybrid vehicle driving apparatus 150 in accordance with the second embodiment. In comparison of the hybrid vehicle driving apparatus 150 with the above-described hybrid vehicle driving apparatus 10, differences lie mainly in the positions of the second bearing 46, the third bearing 48, the eighth bearing 80 and the ninth bearing 82. Accordingly, the configurations of a casing 152, a composite gear shaft 154, a first rotor shaft 156, a power transmission shaft 158 and a second rotor shaft 160 are different from the configuration of the corresponding members in the first embodiment. Hereinafter, the aforementioned differences will be described.

The casing 152 is made up of three case members, which are a housing 162, a case 164, and a cover 166 that are integrated together by bolts. The case 164 is provided with a partition wall 168 that is substantially perpendicular to the rotation axes. The housing 162, the case 164 and the cover 166 may be regarded as case members in the invention.

In the second embodiment, the composite gear shaft 154 is rotatably supported by the casing 152 via a first bearing 42 and a second bearing 46. Concretely, the first bearing 42 is disposed on an axial end portion of an inner periphery of the composite gear shaft 154 which axial end portion is toward a damper device 26, that is, at the damper device 26 side. The composite gear shaft 154 is supported by the housing 162 via the first bearing 42. Thus, the composite gear shaft 154 is rotatable relative to the housing 162. The second bearing 46 is disposed on an axial end portion of the inner periphery of the composite gear shaft 154 which axial end portion is at the first electric motor MG1 side. The composite gear shaft 154 is rotatably supported by a partition wall 168 of the case 164 via the second bearing 46. Thus, the composite gear shaft 154 is rotatable relative to the partition wall 168. The composite gear shaft 154 may be regarded as an output gear shaft in the invention.

The first rotor shaft 156 is rotatably supported by the casing 152 via a third bearing 48 and a fourth bearing 50. Thus, first rotor shaft 156 is rotatable relative to the casing 152. Concretely, the third bearing 48 is disposed on an outer peripheral portion of a portion of the first rotor shaft 156 that is adjacent to an axial middle portion thereof. The first rotor shaft 156 is rotatably supported by the partition wall 168 of the case 164 via the third bearing 48. Thus, first rotor shaft 156 is rotatable relative to the partition wall 168. The fourth bearing 50 is disposed on an axial end portion of the outer periphery of the first rotor shaft 156 which axial end portion is at the cover 166 side. The first rotor shaft 156 is rotatably supported by a cover member 54 via the fourth bearing 50. Thus, the first rotor shaft 156 is rotatable relative to the cover member 54. The cover member 54 is fixed to the cover 166. The outer wheel of the third bearing 48 is press-fitted into the partition wall 168 of the case 164 (outer wheel press-fitting). The first rotor shaft 156 may be regarded as the rotor shaft of the first electric motor in the invention.

The power transmission shaft 158 is rotatably supported by the casing 152 via a seventh bearing 78 and an eighth bearing 80. The power transmission shaft 158 is rotatable relative to the casing 152. Concretely, the seventh bearing 78 is disposed on an axial end portion of the outer periphery of the power transmission shaft 158 which axial end portion is at the housing 162 side. The power transmission shaft 158 is rotatably supported by the housing 162 via the seventh bearing 78. The power transmission shaft 158 is relative to the housing 162. The eighth bearing 80 is disposed on an axial end portion of the outer periphery of the power transmission shaft 158 which axial end portion is at the case 164 side. The power transmission shaft 158 is rotatably supported by the partition wall 168 of the case 164 via the eighth bearing 80. Thus, the power transmission shaft 158 is rotatable relative to the partition wall 168.

The second rotor shaft 160 is rotatably supported by the casing 152 via a ninth bearing 82 and a tenth bearing 84. Thus, the second rotor shaft 160 is rotatable relative to the casing 152. Concretely, the ninth bearing 82 is disposed on an axial end portion of the outer periphery of the second rotor shaft 160 which axial end portion is at the power transmission shaft 158 side. In this manner, the second rotor shaft 160 is rotatably supported by the partition wall 168 of the case 164 via the ninth bearing 82. Thus, the second rotor shaft 160 is rotatable relative to the partition wall 168. Besides, the tenth axis 84 is disposed on an axial end portion of the outer periphery of the second rotor shaft 160 which axial end portion is at the cover 166 side. In this manner, the second rotor shaft 160 is rotatably supported by the cover 166 via the tenth bearing 84. Thus, the second rotor shaft 160 is rotatable relative to the cover 166. The outer wheel of the ninth bearing 82 is press-fitted into the partition wall 168 of the case 164 (outer wheel press-fitting). The second rotor shaft 160 may be regarded as the rotor shaft of the second electric motor in the invention.

The driving apparatus 150 of the second embodiment has a construction in which the composite gear shaft 154, the first rotor shaft 156, the counter shaft 18, the power transmission shaft 158, the second rotor shaft 160 and the differential gear 24 are rotatably supported by the case 164. Concretely, an axial end portion of the inner periphery of the composite gear shaft 154 which axial end portion is at the first electric motor MG1 side is supported by the partition wall 168 of the case 154 via the second bearing 46. Thus, the composite gear shaft 154 is rotatable relative to the partition wall 168. An outer periphery of an axial middle portion of the first rotor shaft 156 is supported by the partition wall 168 of the case 164 via the third bearing 48. Thus, the first rotor shaft 156 is rotatable relative to the partition wall 168. An axial end portion of the outer periphery of the counter shaft 18 which axial end portion is at the case 164 side is rotatably supported by the partition wall 168 of the case 164 via the sixth bearing 66. Thus, the counter shaft 18 is rotatable relative to the partition wall 168. The sixth bearing 66 is press-fitted into the partition wall 168 of the case 164 in the above-described manner of outer wheel press-fitting. An axial end portion of the outer periphery of the power transmission shaft 158 which axial end portion is at the case 164 side is rotatably supported by the partition wall 168 of the case 164 via the eighth bearing 80. Thus, the power transmission shaft 158 is rotatable relative to the partition wall 168. An axial end portion of the outer periphery of the second rotor shaft 160 which axial end portion of the power transmission shaft 158 side is rotatable supported by the partition wall 168 of the case 164 via the ninth bearing 82. Thus, the second rotor shaft 160 is rotatable relative to the partition wall 168. An axial end portion of the outer periphery of a differential case 100 that constitutes the differential gear 24 is rotatable supported by the partition wall 168 of the case via a twelfth bearing 98. Therefore, the differential case 100 is rotatable relative to the case 168. Thus, since the aforementioned rotating shafts 154, 156, 18, 158 and 160 and the differential gear 24 are supported by a common member, that is, the case 164, the accuracy of supporting the rotating shafts and the like improves.

In the second embodiment, the second bearing 46 that supports the composite gear shaft 154 and the third bearing 48 that supports the first rotor shaft 156 are disposed closer to the damper device 26 in the axial direction than the second and third bearings 46 and 48 in the first embodiment are. Furthermore, the eighth bearing 80 that supports the power transmission shaft 158 and the ninth bearing 82 that supports the second rotor shaft 160 are disposed closer to the housing 162 in the axial direction than the eighth and ninth bearings 80 and 82 in the first embodiment are.

As shown in FIG. 3, the ninth bearing 82 that supports the second rotor shaft 160 and the sixth bearing 66 that supports the counter shaft 18 are disposed at such positions as to overlap each other in the radial directions. In this manner of disposal, the ninth bearing 82 and the sixth bearing 66 are disposed in the vicinity of the partition wall 168 that is formed in the case 164. Due to this, the moment load that is input to the case 164 via the ninth bearing 82 and the sixth bearing 66 during power transmission is reduced. Hence, the amount or number of ribs for enhancing the rigidity of the case 164 may be reduced. That is, the mass of the case 164 may be reduced. Furthermore, since the moment load is reduced, the rigidity of the case 164 becomes relatively high. Due to this, the gear noise that occurs at the time of power transmission is reduced.

Furthermore, as shown in FIG. 3, the third bearing 48 that supports the first rotor shaft 156 and the sixth bearing 66 that supports the counter shaft 18 are disposed at such positions as to overlap each other in the radial directions. In this manner of disposal, the third bearing 48 and the sixth bearing 66 are disposed in the vicinity of the partition wall 168 that is formed in the case 164. Due to this, the moment load that is input to the case 164 via the third bearing 48 and the sixth bearing 66 during power transmission is reduced. Hence, the amount or number of ribs for enhancing the rigidity of the case 164 may be reduced. That is, the mass of the case 164 may be reduced. Furthermore, since the moment load is reduced, the rigidity of the case 164 becomes relatively high. Due to this, the gear noise that occurs at the time of power transmission is reduced. Furthermore, since the first electric motor MG1 is disposed even closer to the damper device 26 than the first electric motor MG1 in the first embodiment, the axial length of the first electric motor MG1 is further shortened.

Furthermore, as shown in FIG. 3, the ninth bearing 82 that supports the second rotor shaft 160 and the twelfth bearing 98 that supports the differential gear 24 (the differential case 100) are disposed at such positions as to overlap each other in the radial directions. In this manner of disposal, the ninth bearing 82 and the twelfth bearing 98 are disposed in the vicinity of the partition wall 168 that is formed in the case 164. Due to this, the moment load that is input to the case 164 via the ninth bearing 82 and the twelfth bearing 98 during power transmission is reduced. Hence, the amount or number of ribs for enhancing the rigidity of the case 164 may be reduced. That is, the mass of the case 164 may be reduced. Furthermore, since the moment load is reduced, the rigidity of the case 164 becomes relatively high. Therefore, the gear noise that occurs at the time of power transmission is reduced.

Furthermore, as shown in FIG. 3, the ninth bearing 82 that supports the second rotor shaft 160 and the third bearing 48 that supports the first rotor shaft 156 are disposed at such positions as to overlap each other in the radial directions. In this manner of disposal, the ninth bearing 82 and the third bearing 48 are disposed in the vicinity of the partition wall 168 that is formed in the case 164. Due to this the moment load that is input to the case 164 via the in the bearing 82 and the third bearing 48 during power transmission is reduced. Hence, the amount or number of ribs for enhancing the rigidity of the case 164 may be reduced. That is, the mass of the case 164 may be reduced. Furthermore, since the moment load is reduced, the rigidity of the case 164 becomes relatively high. Therefore, the gear noise that occurs at the time of power transmission is reduced.

Furthermore, as shown in FIG. 3, the third bearing 48 that supports the first rotor shaft 156 and the twelfth bearing 98 that supports the differential gear 24 (the differential case 100) are disposed at such positions as to overlap each other in the radial directions. In this manner of disposal, the third bearing 48 and the twelfth bearing 98 are disposed in the vicinity of the partition wall 168 that is formed in the case 164. Due to this, the moment load that is input to the case 164 via the third bearing 48 and the twelfth bearing 98 during power transmission is reduced. Hence, the amount or number of the ribs for enhancing the rigidity of the case 164 may be reduced. That is, the mass of the case 164 may be reduced. Furthermore, since the moment load is reduced, the rigidity of the case 164 becomes relatively high. Therefore, the gear noise that occurs at the time of power transmission is reduced. Furthermore, each of the differential gear 24 and the first electric motor MG1 is across the partition wall 168 of the case 164 from each other in the axial direction. Therefore, the differential gear 24 and the first electric motor MG1 do not overlap each other in the radial directions. Hence, the radial position of the first electric motor MG1 becomes easily adjustable. Thus, a diameter of the first electric motor MG1 suitable for the purpose of improving fuel economy may be set. Furthermore, the length of the first electric motor MG1 in the radial directions may be set so as to restrain the length of the first electric motor MG1 in the axial direction.

Furthermore, as shown in FIG. 3, the third bearing that supports the first rotor shaft 156, the sixth bearing 66 that supports the counter shaft 18 and the ninth bearing 82 that supports the second rotor shaft 160 are disposed at such positions as to overlap each other in the radial directions. That is, each of the counter bearing 66, the first rotor bearing 48 and the second rotor bearing 82 radially overlaps each of the other of the counter bearing 66, the first rotor bearing 48 and the second rotor bearing 82. The expression "each of the counter bearing 66, the first rotor bearing 48 and the second rotor bearing 82 radially overlaps each of the other of the counter bearing 66, the first rotor bearing 48 and the second rotor bearing 82" means in the embodiment "the counter bearing 66 radially overlaps the first rotor bearing 48, the first rotor bearing 48 radially overlaps the second rotor bearing 82 and the second rotor bearing 82 radially overlaps the counter bearing 66" In this manner of disposal, the third bearing 48, the sixth bearing 66 and the ninth bearing 82 are disposed in the vicinity of the partition wall 168 that is formed in the case 164. Due to this, the moment load that is input to the case 164 via the bearings 48, 66 and 82 during power transmission is reduced. Hence, the amount or number of ribs for enhancing the rigidity of the case 164 may be reduced. That is, the mass of the case 164 may be reduced. Furthermore, since the moment load is reduced, the rigidity of the case 164 becomes relatively high. Therefore, the gear noise that occurs at the time of power transmission is reduced. The first electric motor MG1 and the second electric motor MG2 are disposed astride the partition wall 168 of the case 164. Due to this, the axial positions of the first electric motor MG1 and the second electric motor MG2 are made to substantially coincide with each other. Hence, the axial positions of the coil ends 59 of the first electric motor MG1 and the axial positions of the coil ends 91 of the second electric motor MG2 may be made to substantially coincide with each other. The coil ends 59 are disposed on the both axial ends of the stator 56 of the first electric motor MG1 and the coil ends 91 are disposed on the both axial ends of the stator 88 of the second electric motor MG2. Hence, a cooling oil passageway for cooling the coil ends 59 and 91 can be constructed in a simple fashion.

Furthermore, in the second embodiment, too, the outer wheel of the sixth bearing 66 that supports the counter shaft 18, the outer wheel of the third bearing 48 that supports the first rotor shaft 156 of the first electric motor MG1, and the outer wheel of the ninth bearing 82 that supports the second rotor shaft 160 of the second electric motor MG2 are press-fitted to the case 164 (outer wheel press-fitting). In addition, as described above, the sixth bearing 66 that supports the counter shaft 18, the third bearing 48 that supports the first rotor shaft 156, and the ninth bearing 82 that supports the second rotor shaft 160 radially overlap each other. Due to this, when the sixth bearing 66, the third bearing 48 and the ninth bearing 82 are press-fitted into the outer wheel press-fitting manner, the case 164 into which the outer wheels of these bearings are press-fitted have a generally flat planar shape as shown in FIG. 3. This achieves increased rigidity of the case 164 for the press-fitting load that occurs at the time of the outer wheel press-fitting of the bearings. Hence, the amount of deformation of the case 164 due to the press-fitting operation is made smaller due to the rigidity of the bearings. Furthermore, the number of sites where the case rigidity is increased may be reduced without taking the press-fitting into consideration. Thus, putting extra thicknesses or volumes for increasing the rigidity is not needed, so that it is possible to increase the accuracy of supporting the rotating shafts while reducing the weight.

Furthermore, as shown in FIG. 3, the sixth bearing 66 that supports the counter shaft 18, the ninth bearing 82 that supports the second rotor shaft 160, and the twelfth bearing 98 that supports the differential gear 24 (the differential case 100) are disposed at such positions as to radially overlap each other. In this manner of disposal, the sixth bearing 66, the ninth bearing 82 and the twelfth bearing 98 are disposed in the vicinity of the partition wall 168 that is formed in the case 164. Due to this, the moment load that is input to the case 164 via the bearings 66, 82 and 98 during power transmission is reduced. Hence, the amount or number of ribs for enhancing the rigidity of the case 164 may be reduced. That is, the mass of the case 164 may be reduced. Furthermore, since the moment load is be reduced, the rigidity of the case 164 becomes relatively high. Therefore, the gear noise that occurs at the time of power transmission is reduced.

Still further, as shown in FIG. 3, the third bearing 48 that supports the first rotor shaft 156, the sixth bearing 66 that supports the counter shaft 18, the ninth bearing 82 that supports the second rotor shaft 160, and the twelfth bearing 98 that supports the differential gear 24 (the differential case 100) are disposed at such positions as to radially overlap each other. In this manner of disposal, the third bearing 48, the sixth bearing 66, the ninth bearing 82 and the twelfth bearing 98 are disposed in the vicinity of the partition wall 168 that is formed in the case 164. Due to this, the moment load that is input to the case 164 via the bearings 48, 66, 82 and 98 during power transmission is reduced. Hence, the amount or number of ribs for enhancing the rigidity of the case 164 may be reduced. That is, the mass of the case 164 may be reduced. Furthermore, since the moment load can be reduced, the rigidity of the case 164 becomes relatively high. Therefore, the gear noise that occurs at the time of power transmission is reduced. Furthermore, as shown in FIG. 3, the partition wall 168 of the case 164 is formed so as to be substantially flat. Hence, the rigidity of the case 164 for, for example, the load input by the inverter that is mounted on an upper surface of the case 164, will improve. Thus, the amount or number of ribs for enhancing the rigidity of the case 164 and/or the housing 162 may be reduced. That is, the mass of the casing 152 may be reduced.

As described above, according to the second embodiment, since the composite gear shaft 154, the power transmission shaft 158, the counter shaft 18, the differential gear 24, the first rotor shaft 156 of the first electric motor MG1, the second rotor shaft 160 of the second electric motor MG2 are supported by a common member, that is, the case member 164, the accuracy of supporting the rotating shafts will improve. Furthermore, since these shafts and the like are all supported by a common member, that is, the case member 164, increases in the number of component parts and increases in the weight are restrained.

Furthermore, according to the second embodiment, the outer wheel of the sixth bearing 66 that supports the counter shaft 18, the outer wheel of the third bearing 48 that supports the first rotor shaft 156 of the first electric motor MG1, and the outer wheel of the ninth bearing 82 that supports the second rotor shaft 160 of the second electric motor MG2 are press-fitted into the case 164. Due to this, the sixth bearing 66, the third bearing 48 and the ninth bearing 82 radially overlap each other. In this manner, the case 164 into which the sixth bearing 66, the third bearing 48 and the ninth bearing 82 are press-fit have a generally flat planar shape. Therefore, the rigidity of the case 164 for the press-fitting load, which occurs at the time of the outer wheel press-fitting of the bearings, increases. Hence, the amount of deformation of the case 164 due to the press-fitting operation is made smaller due to the rigidity of the bearings. Besides, the number of sites where the case rigidity is increased may be reduced without taking the press-fitting into consideration. Thus, putting extra thicknesses or volumes for increasing declines is not needed, so that it is possible to increase the accuracy of supporting the rotating shafts while reducing the weight.

While the embodiments (first and second embodiments) of the invention have been described above with reference to the drawings, the invention is applicable to other forms as well.

In the hybrid vehicle driving apparatus 10 of the first embodiment, the second bearing 46, the sixth bearing 66, the eighth bearing 80 and the twelfth bearing 98 are disposed at such positions as to radially overlap each other. However, it is not necessary that all the bearings radially overlap each other. The effects of the invention can be obtained as long as at least two of the fourth bearings 46, 66, 90 and 98 radially overlap each other.

Furthermore, although in the foregoing embodiments, the bearings radially overlap each other, it is not altogether necessary that the bearings overlap each other entirely in the axial direction. It is also permissible to adopt a construction in which portions of bearings overlap each other in the axial direction.

The foregoing embodiments are mere embodiments, and the invention can be carried out with various changes and improvements based on knowledge of those having ordinary skill in the art.

What is claimed is:

1. A hybrid vehicle driving apparatus comprising:
a first rotor shaft of a first electric motor, the first rotor shaft being disposed on a first axis;
a power distribution mechanism that includes a planetary gear device and is disposed on the first axis;
an output gear shaft that is an output member of the power distribution mechanism and is disposed on the first axis;
a counter shaft disposed on a second axis;
a second rotor shaft of a second electric motor, the second rotor shaft being disposed on a third axis;
a power transmission shaft disposed on the third axis;
a differential gear disposed on a fourth axis;
a casing that includes a plurality of case members;
a counter bearing that supports the counter shaft;
a first rotor bearing that supports the first rotor shaft; and
a second rotor bearing that supports the second rotor shaft, wherein
the output gear shaft, the power transmission shaft, the counter shaft, the differential gear, the first rotor shaft, and the second rotor shaft are rotatably supported by a common case member that is one of the case members,
an outer wheel of the counter bearing, an outer wheel of the first rotor bearing, and an outer wheel of the second rotor bearing are press-fitted into the common case member,
the first axis, the second axis and the third axis are parallel to each other, and
the counter bearing, the first rotor bearing, and the second rotor bearing radially overlap each other.

2. A hybrid vehicle driving apparatus, comprising:
a first rotor shaft of a first electric motor, the first rotor shaft being disposed on a first axis;
a power distribution mechanism that includes a planetary gear device and is disposed on the first axis;
an output gear shaft that is an output member of the power distribution mechanism and is disposed on the first axis;
a counter shaft disposed on a second axis;
a second rotor shaft of a second electric motor, the second rotor shaft being disposed on a third axis;
a power transmission shaft disposed on the third axis;
a differential gear disposed on a fourth axis;
a casing that includes a plurality of case members;
an output gear bearing that supports the output gear shaft;
a power transmission bearing that supports the power transmission shaft;
a counter bearing that supports the counter shaft; and
a differential gear bearing that supports the differential gear, wherein
the output gear shaft, the power transmission shaft, the counter shaft, the differential gear, the first rotor shaft, and the second rotor shaft are rotatably supported by a common case member that is one of the case members,
the first axis, the second axis, the third axis and the fourth axis are parallel to each other, and
the output gear bearing, the power transmission bearing, the counter bearing and the differential gear bearing radially overlap each other.

* * * * *